US012422891B2

(12) United States Patent
Kim et al.

(10) Patent No.: US 12,422,891 B2
(45) Date of Patent: Sep. 23, 2025

(54) ELECTRONIC DEVICE INCLUDING CONNECTING MEMBER OF INTERNAL STRUCTURE

(71) Applicant: SAMSUNG ELECTRONICS CO., LTD., Suwon-si (KR)

(72) Inventors: Joosung Kim, Suwon-si (KR); Sanguk Kim, Suwon-si (KR); Hyoseok Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 110 days.

(21) Appl. No.: 18/232,139

(22) Filed: Aug. 9, 2023

(65) Prior Publication Data

US 2024/0118730 A1    Apr. 11, 2024

Related U.S. Application Data

(63) Continuation of application No. PCT/KR2023/010138, filed on Jul. 14, 2023.

(30) Foreign Application Priority Data

Oct. 6, 2022   (KR) .................. 10-2022-0128146
Nov. 2, 2022   (KR) .................. 10-2022-0144605

(51) Int. Cl.
*G06F 1/16*    (2006.01)
*H04M 1/02*   (2006.01)

(52) U.S. Cl.
CPC .......... *G06F 1/1637* (2013.01); *G06F 1/1626* (2013.01); *G06F 1/1658* (2013.01); *H04M 1/0266* (2013.01)

(58) Field of Classification Search
CPC ..... G06F 1/1637; G06F 1/1658; G06F 1/1656
See application file for complete search history.

(56) References Cited

U.S. PATENT DOCUMENTS 8,058,569 B2   11/2011   Kline
9,137,891 B2    9/2015   Gibbs et al.
(Continued)

FOREIGN PATENT DOCUMENTS

CN    103167791 A    6/2013
CN    205004435 U    1/2016
(Continued)

OTHER PUBLICATIONS

International Search Report and Written Opinion (PCT/ISA/210 and PCT/ISA/237) dated Nov. 6, 2023, issued by International Searching Authority for International Application No. PCT/KR2023/010138.

*Primary Examiner* — Allen L Parker
*Assistant Examiner* — Dakota M Talbert
(74) *Attorney, Agent, or Firm* — Sughrue Mion, PLLC

(57) ABSTRACT

An electronic device includes a display; a conductive plate supporting the display; a bracket including a surface and a structure at least partially removed from the surface, wherein the surface faces toward the conductive plate and is spaced apart from the conductive plate; a connecting member crossing the structure along the surface and connecting the conductive plate and the bracket, the connecting member including a first conductive portion and a second conductive portion; and a conductive tape between the connecting member and the bracket, wherein the first conductive portion overlaps with the structure when viewed from a first direction toward the display and is at least partially inserted into the structure, at least part of the first conductive portion contacts the conductive plate, and the second conductive portion extends from the first conductive portion along a surface of the bracket and has an end attached to the bracket through the conductive tape.

20 Claims, 12 Drawing Sheets

(56) References Cited

U.S. PATENT DOCUMENTS

| | | | |
|---|---|---|---|
| 9,538,681 | B2 | 1/2017 | Kim et al. |
| 9,986,072 | B2 | 5/2018 | Lee et al. |
| 10,601,113 | B2 | 3/2020 | Bae et al. |
| 11,431,830 | B2 | 8/2022 | Park et al. |
| 2012/0162953 | A1 | 6/2012 | Wojack et al. |
| 2014/0216806 | A1 | 8/2014 | Poulsen et al. |
| 2018/0232009 | A1 | 8/2018 | Matthew et al. |
| 2020/0089287 | A1* | 3/2020 | Oster .................. G06F 1/1637 |
| 2023/0195186 | A1 | 6/2023 | Kim et al. |

FOREIGN PATENT DOCUMENTS

| | | |
|---|---|---|
| KR | 10-1413313 B1 | 6/2014 |
| KR | 10-2014-0114096 A | 9/2014 |
| KR | 10-2016-0096927 A | 8/2016 |
| KR | 10-1975339 B1 | 5/2019 |
| KR | 10-2019-0106187 A | 9/2019 |
| KR | 10-2022-0015758 A | 2/2022 |
| KR | 10-2388342 B1 | 4/2022 |
| KR | 10-2022-0125440 A | 9/2022 |

* cited by examiner

ELECTRONIC DEVICE INCLUDING CONNECTING MEMBER OF INTERNAL STRUCTURE

CROSS-REFERENCE TO RELATED APPLICATIONS

This application is a by-pass continuation of an International Application No. PCT/KR2023/010138, filed on Jul. 14, 2023, which is based on and claims the benefit of Korean Patent Application No. 10-2022-0128146, filed on Oct. 6, 2022, in the Korean Intellectual Property Office, and of Korean Patent Application No. 10-2022-0144605, filed on Nov. 2, 2022, in the Korean Intellectual Property Office, the disclosure of each of which is incorporated by reference herein in its entirety.

BACKGROUND

1. Field

The disclosure relates to an electronic device including a connecting member of an internal structure.

2. Description of Related Art

An electronic device may include various structures therein. Between the structure and the electronic components or between the structure and another structure may include a spaced portion. The electronic device may include connecting members disposed between spaced portions and supporting the structure or the electronic component.

The connecting members may have different structures depending on the structure or the electronic component supported by the connecting member.

SUMMARY

According to an aspect of the disclosure, an electronic device includes: a display; a conductive plate supporting the display; a bracket including a first surface and a structure at least partially removed from the first surface, wherein the first surface faces toward the conductive plate and is spaced apart from the conductive plate; a connecting member crossing the structure along the first surface and electrically connecting the conductive plate and the bracket, the connecting member including a first conductive portion and a second conductive portion; and a conductive tape between the connecting member and the bracket, wherein the first conductive portion overlaps with the structure when viewed from a first direction and is at least partially inserted into the structure, at least part of the first conductive portion contacts the conductive plate, and the second conductive portion extends from the first conductive portion along a surface of the bracket and has an end attached to the bracket through the conductive tape.

At least a portion of a side surface of the first conductive portion may face an inner surface of the structure.

The side surface of the first conductive portion may be spaced apart from the inner surface of the structure.

A distance between the conductive plate and the bracket may be smaller than a distance between a surface of the first conductive portion in contact with the conductive plate and another surface of the first conductive portion opposite from the surface of the first conductive portion in contact with the conductive plate.

A portion of the second conductive portion in contact with the first conductive portion may be disposed inside the structure.

The electronic device may further include a supporter between the conductive plate and the bracket, and the supporter may be configured to provide a gap between the conductive plate and the bracket.

The first conductive portion may include a core providing a shape of the first conductive portion and conductive fibers surrounding at least a portion of the core.

The core may include a metal material supporting the conductive plate.

The core may include a deformable elastic material.

The second conductive portion may include conductive fibers configured to electrically connect to the bracket.

The connecting member may further include a third conductive portion crossing a region of the structure that overlaps with the second conductive portion when viewing the display from the first direction, and a second conductive tape attaching an end of the third conductive portion to the first surface of the bracket.

The first conductive portion may be between the conductive plate and the second conductive portion, and the connecting member may electrically connect the conductive plate and the bracket through the first conductive portion and the second conductive portion.

The structure may include a groove recessed from the first surface of the bracket, and a portion of the first conductive portion and the second conductive portion may be disposed within the groove and may be spaced apart from an inner surface of the groove.

The structure may include a through hole extending from the first surface of the bracket to a second surface of the bracket opposite from the first surface.

The electronic device may further include a printed circuit board disposed at an end of the through hole formed on the second surface, and a portion of the first conductive portion and the second conductive portion may be disposed within the through hole and may be spaced apart from the printed circuit board.

The electronic device may further include a second conductive tape between the first conductive portion and the conductive plate.

The first conductive portion may be configured to be moved into the structure based on deformation of the display caused by an external force applied to the display.

According to an aspect of the disclosure, an electronic device includes: a conductive plate; a display contacting the conductive plate; a bracket including a first surface and a structure at least partially removed from the first surface, wherein the first surface faces toward the display; a supporter between the display and the bracket to form a gap between the display and the bracket; a connecting member crossing the structure along the first surface and electrically connecting the conductive plate and the bracket, the connecting member including a first conductive portion and a second conductive portion; a first conductive tape between the connecting member and the bracket; and a second conductive tape between the connecting member and the conductive plate, wherein the first conductive portion overlaps with the structure when viewed from a first direction and is at least partially inserted into the structure, the first conductive portion contacts the conductive plate through the second conductive tape, and the second conductive portion extends from the first conductive portion along a surface of the bracket and has an end attached to the bracket through the second conductive tape.

A height of the supporter may be smaller than a distance from a surface of the first conductive portion in contact with the conductive plate to a surface of the first conductive portion opposite from the surface of the first conductive portion in connect with the conductive plate.

At least portion of a side surface of the first conductive portion may be spaced apart from an inner surface of the structure and faces the inner surface of the structure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
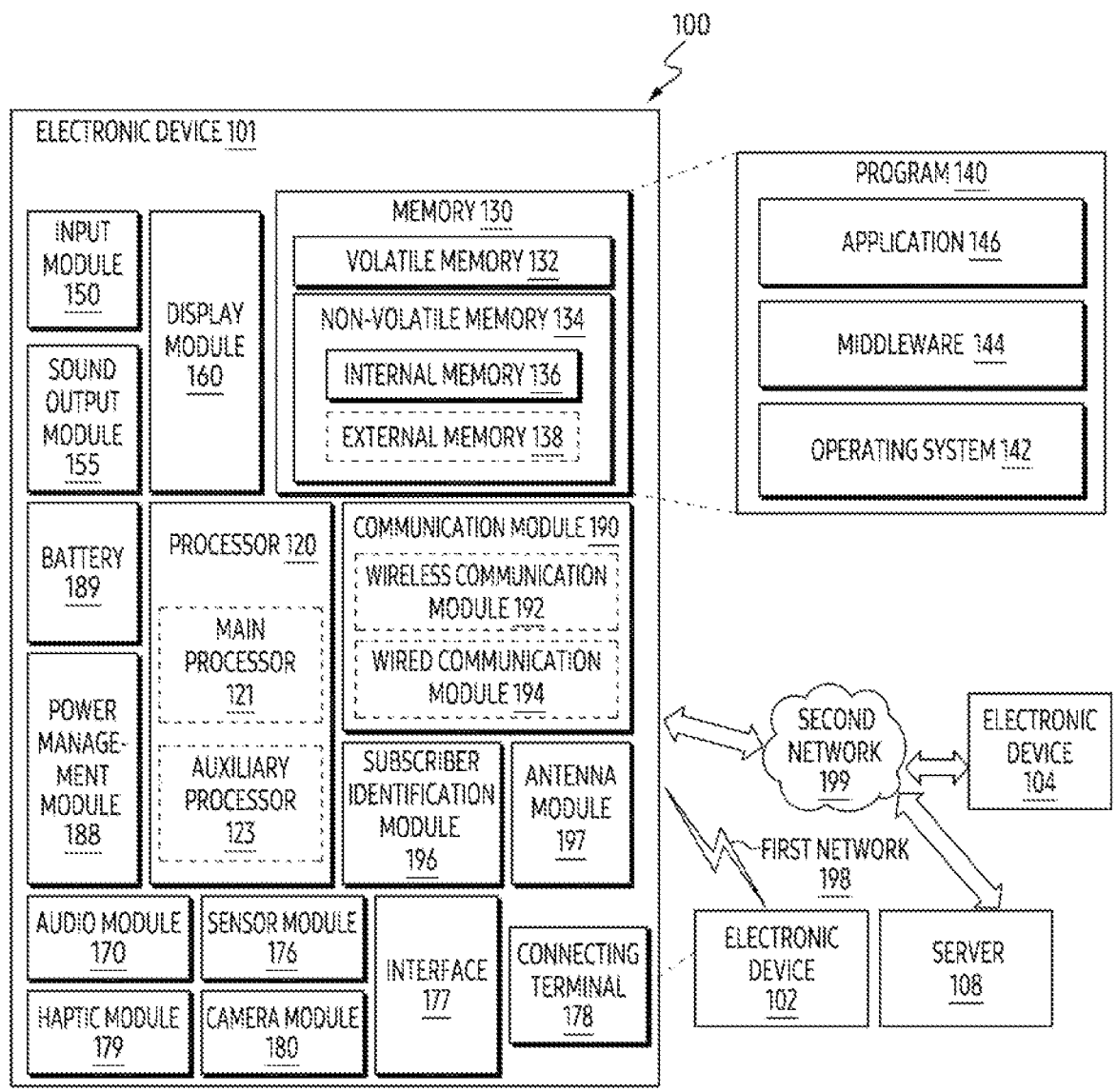
FIG. 1 is a block diagram of an electronic device in a network environment according to one or more embodiments.

FIG. 1 is a block diagram illustrating an electronic device 101 in a network environment 100 according to one or more embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
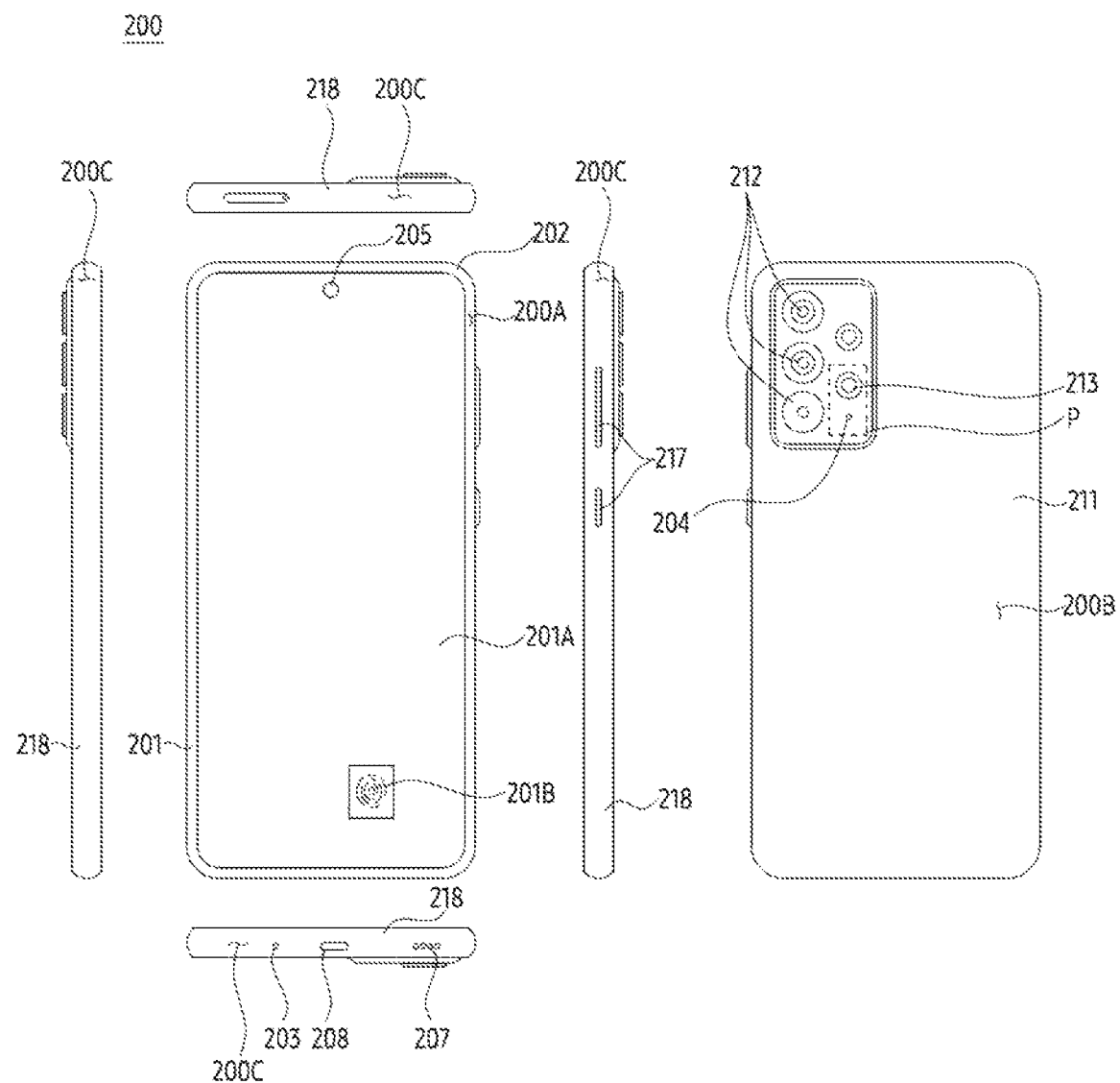
FIG. 2 is a diagram illustrating an electronic device according to an embodiment.

FIG. 2 is a diagram illustrating an electronic device according to an embodiment.

Referring to FIG. 2, an electronic device 200 (e.g., an electronic device 101 of FIG. 1) according to an embodiment may include a housing 210 forming an exterior of the electronic device 200. For example, the housing 210 may include a front surface 200A, a rear surface 200B, and a side surface 200C surrounding a space between the first surface 200A and the second surface 200B. In an embodiment, the housing 210 may refer to a structure (e.g., a frame structure 240 of FIG. 3) forming at least a portion of the first surface 200A, the second surface 200B, and/or the third surface 200C.

The electronic device 200 according to an embodiment may include a substantially transparent front plate 202. In an embodiment, the front plate 202 may form at least a portion of the first surface 200A. In an embodiment, the front plate 202 may include, for example, a glass plate including various coating layers or a polymer plate, but is not limited thereto.

The electronic device 200 according to an embodiment may include a substantially opaque rear plate 211. In an embodiment, the rear plate 211 may form at least a portion of the second surface 200B. In an embodiment, the rear plate 211 may be formed of coated or colored glass, ceramic, polymer, metal (e.g., aluminum, stainless steel (STS), or magnesium), or a combination of at least two of the above materials.

Figure 3:
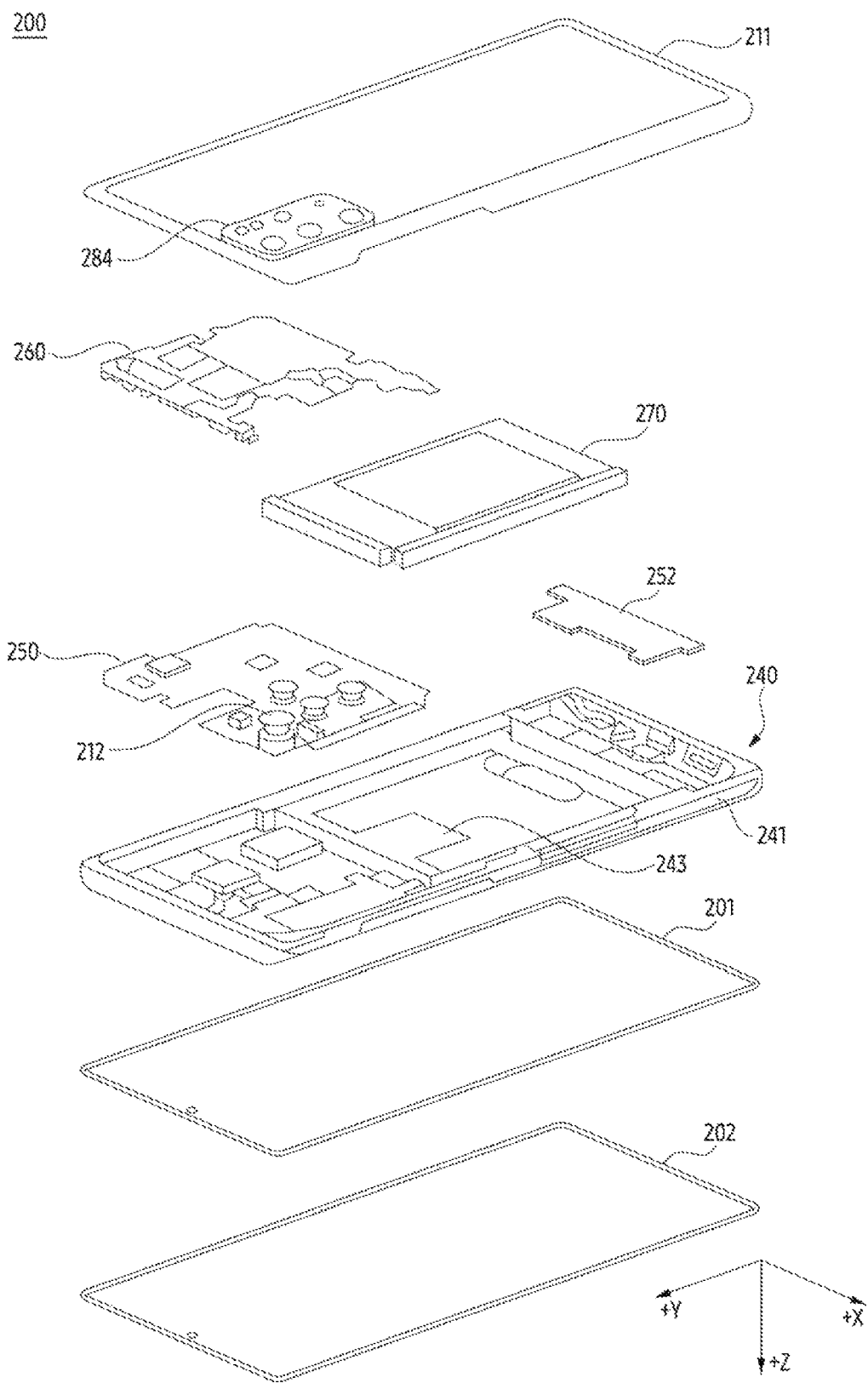
FIG. 3 is an exploded perspective view of an electronic device according to an embodiment.

The electronic device 200 according to an embodiment may include a side bezel structure (or side member) 218 (e.g., a side wall 241 of a frame structure 240 of FIG. 3). In an embodiment, the side bezel structure 218 may be coupled to the front plate 202 and/or the rear plate 211 to form at least a portion of the third surface 200C of the electronic device 200. For example, the side bezel structure 218 may form all of the third surface 200C of the electronic device 200, and for another example, the side bezel structure 218 may form the third surface 200C of the electronic device 200 together with the front plate 202 and/or the rear plate 211.

When the third surface 200C of the electronic device 200 is partially formed by the front plate 202 and/or the rear plate 211, the front plate 202 and/or the rear plate 211 may include a region that is bent from a periphery thereof toward the rear plate 211 and/or the front plate 202 and seamlessly extends. The extended region of the front plate 202 and/or the rear plate 211 may be positioned at both ends of, for example, a long edge of the electronic device 200, but is not limited to the above-described examples.

In an embodiment, the side bezel structure 218 may include a metal and/or a polymer. In an embodiment, the rear plate 211 and the side bezel structure 218 may be integrally formed and may include the same material (e.g., a metal material such as aluminum), but are not limited thereto. For example, the rear plate 211 and the side bezel structure 218 may be formed in separate configurations and/or may include different materials.

In an embodiment, the electronic device 200 may include at least one of a display 201, an audio module 203, 204, 207, a sensor module, a camera module 205 or 212, a flash 213, a key input device 217, a light emitting device, and/or a connector hole 208. In another embodiment, the electronic device 200 may omit at least one of the components (e.g., a key input device 217 or a light emitting device), or may further include another component.

In an embodiment, the display 201 (e.g., a display module 160 of FIG. 1) may be visually exposed through a substantial portion of the front plate 202. For example, at least a portion of the display 201 may be visible through the front plate 202 forming the first surface 200A. In an embodiment, the display 201 may be disposed on the rear surface of the front plate 202.

In an embodiment, the appearance of the display 201 may be formed substantially the same as the appearance of the front plate 202 adjacent to the display 201. In an embodiment, in order to expand the area in which the display 201 is visually exposed, the distance between the outside of the display 201 and the outside of the front plate 202 may be formed to be generally the same.

In an embodiment, the display 201 (or the first surface 200A of the electronic device 200) may include a screen display area 201A. In an embodiment, the display 201 may provide visual information to a user through the screen display area 201A. In the illustrated embodiment, when the first surface 200A is viewed from the front, it is illustrated that the screen display area 201A is spaced apart from the outside of the first surface 200A and is positioned inside the first surface 200A, but it is not limited thereto. In another embodiment, when the first surface 200A is viewed from the front, at least a portion of the periphery of the screen display area 201A may substantially coincide with the periphery of the first surface 200A (or the front plate 202).

In an embodiment, the screen display area 201A may include a sensing area 201B configured to obtain biometric information of a user. Here, the meaning of "the screen display area 201A includes the sensing area 201B" may be understood to mean that at least a portion of the sensing area 201B may be overlapped on the screen display area 201A. For example, the sensing area 201B, like other areas of the screen display area 201A, may refer to an area in which visual information may be displayed by the display 201 and additionally biometric information (e.g., fingerprint) of a user may be obtained. In another embodiment, the sensing area 201B may be formed in the key input device 217.

In an embodiment, the display 201 may include an area in which the first camera module 205 (e.g., a camera module 180 of FIG. 1) is positioned. In an embodiment, an opening may be formed in the area of the display 201, and the first camera module 205 (e.g., a punch hole camera) may be at least partially disposed in the opening to face the first surface 200A. In this case, the screen display area 201A may surround at least a portion of the periphery of the opening. In another embodiment, the first camera module 205 (e.g., an under display camera (UDC)) may be disposed under the display 201 to overlap the area of the display 201. In this case, the display 201 may provide visual information to the user through the area, and additionally, the first camera module 205 may obtain an image corresponding to a direction facing the first surface 200A through the area of the display 201.

In an embodiment, the display 201 may be coupled to or disposed adjacent to a touch sensing circuit, a pressure sensor capable of measuring the intensity (pressure) of the touch, and/or a digitizer that detects a magnetic field type stylus pen.

In an embodiment, the audio modules 203, 204 and 207 (e.g., an audio module 170 of FIG. 1) may include microphone holes 203 and 204 and a speaker hole 207.

In an embodiment, the microphone holes 203 and 204 may include a first microphone hole 203 formed in a partial area of the third surface 200C and a second microphone hole 204 formed in a partial area of the second surface 200B. A microphone for obtaining an external sound may be disposed inside the microphone holes 203 and 204. The microphone may include a plurality of microphones to detect the direction of sound.

In an embodiment, the second microphone hole 204 formed in a partial area of the second surface 200B may be disposed adjacent to the camera modules 205 and 212. For example, the second microphone hole 204 may obtain sound according to operations of the camera modules 205, 212, and 213. However, it is not limited thereto.

In an embodiment, the speaker hole 207 may include an external speaker hole 207 and a receiver hole for a call. The external speaker hole 207 may be formed on a portion of the third surface 200C of the electronic device 200. In another embodiment, the external speaker hole 207 may be implemented as one hole with the microphone hole 203. A receiver hole for a call may be formed on another portion of the third surface 200C. For example, the receiver hole for a call may be formed on the opposite side of the external speaker hole 207 on the third surface 200C. For example, based on the illustration of FIG. 2, the external speaker hole 207 may be formed on the third surface 200C corresponding to the lower end of the electronic device 200, and the receiver hole for a call may be formed on the third surface 200C corresponding to the upper end of the electronic device 200. However, the present disclosure is not limited thereto, and in another embodiment, the receiver hole for a call may be formed at a position other than the third surface 200C. For example, the receiver hole for a call may be formed by a space spaced apart between the front plate 202 (or display 201) and the side bezel structure 218.

In an embodiment, the electronic device 200 may include at least one speaker configured to output sound to the outside of the housing 210 through an external speaker hole 207 and/or a receiver hole for a call.

In an embodiment, the sensor module (e.g., a sensor module 176 of FIG. 1) may generate an electrical signal or data value corresponding to an internal operating state or an external environmental state of the electronic device 200. For example, the sensor module may include at least one of a proximity sensor, an HRM sensor, a fingerprint sensor, a gesture sensor, a gyro sensor, a pressure sensor, a magnetic sensor, an acceleration sensor, a grip sensor, a color sensor, an infrared (IR) sensor, a biometric sensor, a temperature sensor, a humidity sensor, and an illumination sensor.

In an embodiment, the camera modules 205 and 212 (e.g., a camera module 180 of FIG. 1) may include a first camera module 205 disposed to face the first surface 200A of the electronic device 200, a second camera module 212 disposed to face the second surface 200B, and a flash 213.

In an embodiment, the second camera module 212 may include a plurality of cameras (e.g., a dual camera, a triple camera, or a quad camera). However, the second camera module 212 is not necessarily limited to including a plurality of cameras, and may include one camera.

In an embodiment, the first camera module 205 and the second camera module 212 may include one or a plurality of lenses, an image sensor, and/or an image signal processor.

In an embodiment, the flash 213 may include, for example, a light emitting diode or a xenon lamp. In another embodiment, two or more lenses (infrared camera, wide-angle and telephoto lens) and image sensors may be disposed on one side of electronic device 200.

In an embodiment, the key input device 217 (e.g., an input module 150 of FIG. 1) may be disposed on the third surface 200C of the electronic device 200. In another embodiment, the electronic device 200 may not include some or all of the key input devices 217, and the not included key input device 217 may be implemented on the display 201 in another form such as a soft key.

In an embodiment, the connector hole 208 may be formed on the third surface 200C of the electronic device 200 to accommodate the connector of the external device. A connection terminal (e.g., a connection terminal 178 of FIG. 1) electrically connected to the connector of the external device may be disposed in the connector hole 208. The electronic device 200 according to an embodiment may include an interface module (e.g., an interface 177 of FIG. 1) for processing electrical signals transmitted and received through the connection terminal.

In an embodiment, the electronic device 200 may include a light emitting device. For example, the light emitting device may be disposed on the first surface 200A of the housing 210. The light emitting device may provide state information of the electronic device 200 in a form of light. In another embodiment, the light emitting device may provide a light source when the first camera module 205 is operated. For example, the light emitting device may include an LED, an IR LED, and/or a xenon lamp.

FIG. 3 is an exploded perspective view of an electronic device according to an embodiment.

Hereinafter, redundant descriptions of configurations having the same reference numerals as those described above will be omitted.

Referring to FIG. 3, an electronic device 200 according to an embodiment may include a display 201, a front plate 202, a rear plate 211, a frame structure 240, a first printed circuit board 250, a second printed circuit board 252, a cover plate 260, and a battery 270.

In an embodiment, the frame structure 240 may include a sidewall 241 forming the exterior (e.g., a third surface 200C of FIG. 2) of the electronic device 200 and a support portion 243 extending inward from the sidewall 241. In an embodiment, the frame structure 240 may be disposed between the display 201 and the rear plate 211. In an embodiment, the sidewall 241 of the frame structure 240 may surround a space between the rear plate 211 and the front plate 202 (and/or the display 201), and the support portion 243 of the frame structure 240 may extend from the sidewall 241 in the space. According to an embodiment, the sidewall 241 forming a side surface (e.g., a side surface 200C of FIG. 2) of the electronic device 200 may include a speaker hole (e.g., a speaker hole 207 of FIG. 2) connecting the inside and outside of the electronic device 200. The speaker hole 207 may pass through the sidewall 241. An audio signal output from a speaker disposed inside the electronic device 200 may be transmitted to the outside of the electronic device 200 through the speaker hole 207.

In an embodiment, the frame structure 240 may support or accommodate other components included in the electronic device 200. For example, the display 201 may be disposed on one surface of the frame structure 240 facing one direction (e.g., +Z direction), and the display 201 may be supported by the support portion 243 of the frame structure 240. For another example, the first printed circuit board 250, the second printed circuit board 252, the battery 270, and a second camera module (e.g., a second camera module 212 of FIG. 2) may be disposed on the other surface of the frame structure 240 facing the direction (e.g., −Z direction) opposite to the one direction. The first printed circuit board 250, the second printed circuit board 252, the battery 270, and the second camera module 212 may be seated in recesses defined by the sidewall 241 and/or the support portion 243 of the frame structure 240, respectively.

In an embodiment, the first printed circuit board 250, the second printed circuit board 252, and the battery 270 may be coupled to the frame structure 240, respectively. For example, the first printed circuit board 250 and the second printed circuit board 252 may be fixedly disposed on the frame structure 240 through a coupling member such as a screw. For example, the battery 270 may be fixedly disposed in the frame structure 240 through an adhesive member (e.g., a double-sided tape). However, it is not limited by the above-described example.

In an embodiment, the cover plate 260 may be disposed between the first printed circuit board 250 and the rear plate 211. In an embodiment, the cover plate 260 may be disposed on the first printed circuit board 250. For example, the cover plate 260 may be disposed on a surface of the first printed circuit board 250 facing the —Z direction.

In an embodiment, the cover plate 260 may at least partially overlap the first printed circuit board 250 when viewed along the Z axis. In an embodiment, the cover plate 260 may cover at least a partial region of the first printed circuit board 250. Through this, the cover plate 260 may protect the first printed circuit board 250 from physical impact or prevent separation of a connector coupled to the first printed circuit board 250.

In an embodiment, the cover plate 260 may be fixedly disposed on the first printed circuit board 250 through the coupling member (e.g., the screw) or may be coupled to the frame structure 240 together with the first printed circuit board 250 through the coupling member.

In an embodiment, the display 201 may be disposed between the frame structure 240 and the front plate 202. For example, the front plate 202 may be disposed on one side (e.g., the +Z direction) of the display 201 and the frame structure 240 may be disposed on the other side (e.g., the −Z direction) of the display 201.

In an embodiment, the front plate 202 may be coupled to the display 201. For example, the front plate 202 and the display 201 may be adhered to each other through an optical adhesive member (e.g., optically clear adhesive (OCA) or optically clear resin (OCR)) interposed therebetween.

In an embodiment, the front plate 202 may be coupled to the frame structure 240. For example, the front plate 202 may include an outer portion extending outside the display 201 when viewed in the Z axis direction, and may be adhered to the frame structure 240 through the adhesive member (e.g., the double-sided tape) disposed between the outer portion of the front plate 202 and the frame structure 240 (e.g., the sidewall 241). However, the disclosure is not limited by the above-described example.

In an embodiment, a processor (e.g., a processor 120 of FIG. 2), a memory (e.g., a memory 130 of FIG. 2), and/or an interface (e.g., an interface 177 of FIG. 2) may be equipped in the first printed circuit board 250 and/or the second printed circuit board 252. The processor may include, for example, one or more of a central processing unit, an application processor, a graphic processing unit, an image signal processor, a sensor hub processor, or a communication processor. The memory may include, for example, volatile memory or non-volatile memory. The interface may include, for example, a high definition multimedia interface (HDMI), a universal serial bus (USB) interface, an SD card interface, and/or an audio interface. The interface may electrically or physically connect the electronic device 200 to an external electronic device, and may include a USB connector, an SD card/MMC connector, or an audio connector. In an embodiment, the first printed circuit board 250 and the second printed circuit board 252 may be operatively or electrically connected to each other through the connecting member (e.g., a flexible printed circuit board).

In an embodiment, the battery 270 (e.g., a battery 189 of FIG. 2) may supply power to at least one component of the electronic device 200. For example, the battery 270 may include a rechargeable secondary battery or a fuel cell. At least a portion of the battery 270 may be disposed on substantially the same plane as the first printed circuit board 250 and/or the second printed circuit board 252.

The electronic device 200 according to an embodiment may include an antenna module (e.g., an antenna module 197 of FIG. 2). In an embodiment, the antenna module may be disposed between the rear plate 211 and the battery 270. The antenna module may include, for example, a near field communication (NFC) antenna, a wireless charging antenna, and/or a magnetic secure transmission (MST) antenna. The antenna module may, for example, perform short-range communication with an external device or wirelessly transmit/receive power with an external device.

In an embodiment, a first camera module (e.g., a first camera module 205 of FIG. 2) (e.g., a front camera) may be disposed at least a portion (e.g., the support portion 243) of the frame structure 240 so that the lens may receive external light through a partial region of the front plate 202 (e.g., a front surface 200A of FIG. 2).

In an embodiment, the second camera module 212 (e.g., a rear camera) may be disposed between the frame structure 240 and the rear plate 211. In an embodiment, the second camera module 212 may be electrically connected to the first printed circuit board 250 through the connecting member (e.g., the connector). In an embodiment, the second camera module 212 may be disposed so that the lens may receive the external light through a camera region 284 of the rear plate 211 of the electronic device 200.

In an embodiment, the camera region 284 may be formed on a surface (e.g., a rear surface 200B of FIG. 2) of the rear plate 211. In an embodiment, the camera region 284 may be formed to be at least partially transparent so that the external light may be incident into the lens of the second camera module 212. In an embodiment, at least a portion of the camera region 284 may protrude from the surface of the rear plate 211 to a predetermined height. However, the disclosure is not limited thereto, and in another embodiment, the camera region 284 may form substantially the same plane as the surface of the rear plate 211.

In an embodiment, the housing 210 of the electronic device 200 may mean a configuration or structure that forms at least a portion of the exterior of the electronic device 200.

In this regard, at least some of the front plate 202, the frame structure 240, and/or the rear plate 211 forming the exterior of the electronic device 200 may be referred to as the housing 210 of the electronic device 200.

Figure 4:
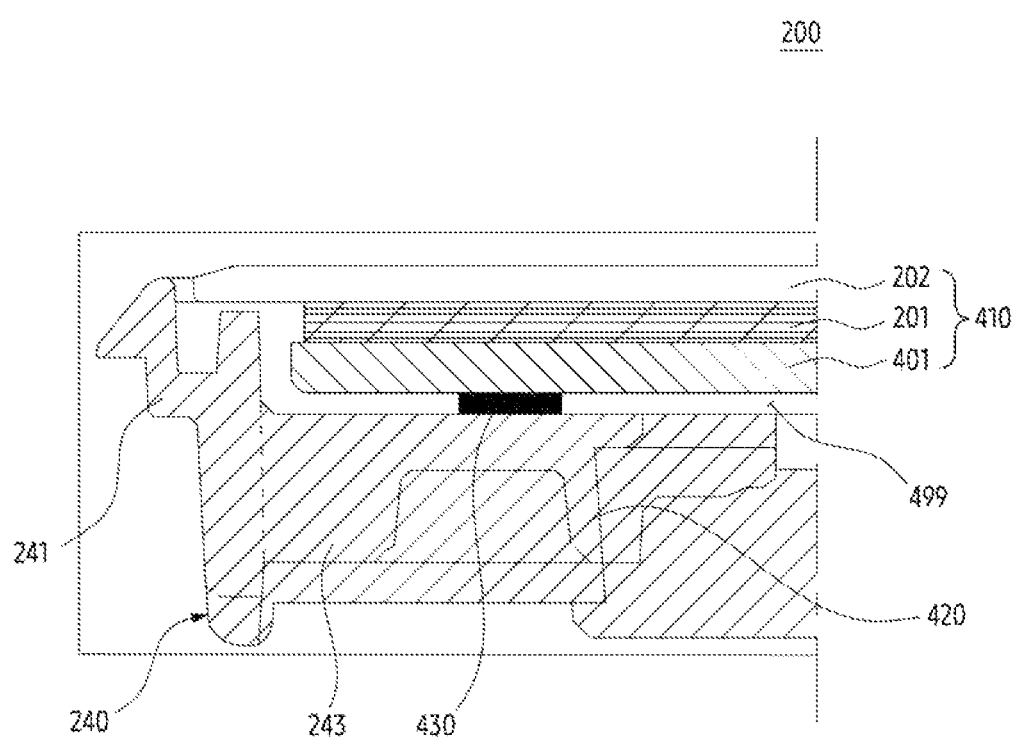
FIG. 4 is a cross-sectional view which cut a portion of an exemplary electronic device according to an embodiment.

FIG. 4 is a cross-sectional view which cuts a portion of an exemplary electronic device according to an embodiment.

Referring to FIG. 4, an electronic device 200 may include a frame structure 240, a display module 410, and a connecting member 430.

According to an embodiment, the frame structure 240 may include a sidewall 241 and a support portion 243. The support portion 243 may extend from the sidewall 241 into the electronic device 200. The support portion 243 may support electronic components in the electronic device 200. For example, the support portion 243 may support the display module 410. An adhesive member may be included between the support portion 243 and the display module 410. A gap 499 may be formed between the support portion 243 and the display module 410 by the adhesive member.

The display module 410 may include a conductive plate 401, a display 201, and a front plate 202. The front plate 202 may transmit light emitted from the display 201 to the outside. For example, the front plate 202 may include at least a partially transparent portion. The front plate 202 may include a region to which a light blocking material is applied along the edge. The front plate 202 may include a transparent material glass or a polymer material. The display 201 may transmit light to the outside through the front plate 202. The display 201 may provide visual information to the user by providing light to the outside. For example, the display 201 may display visual information on the display region by providing color in units of pixels. The display 201 may include a light emitting diode or a backlight in order to supply light. The display 201 may include a liquid crystal display (LCD), a light emitting diode (LED) display, an organic light emitting diode (OLED) display, a micro LED display, or a quantum dot LED (QLED) display. The display module 410 may include the conductive plate 401 disposed on the rear surface of the display 201. The conductive plate 401 may support components (e.g., the display 201, a light guide plate, or the light emitting diode) configuring the display module 410. The conductive plate 401 may be formed of a metal material having rigidity in order to support the components. The conductive plate 401 may include steel use stainless (SUS).

According to an embodiment, the support portion 243 may include a bracket 420 formed of a plate supporting electronic components in the electronic device 200. The bracket 420 may include a conductive material. According to an embodiment, the bracket 420 may include the conductive material and a non-conductive material. For example, the bracket 420 may be integrally formed of the conductive material and the non-conductive material through double injection. The electronic device 200 may include the gap 499 between the conductive plate 401 and the bracket 420 in order to reduce a pooling phenomenon of the display 201, which is the LCD. The pooling phenomenon may occur when a liquid crystal in the display 201 is deformed by pressing the surface of the display 201 using the LCD. For example, in case that the display region of the display 201 is pressed from the outside, a partially yellow tint (or a yellow dot) or a white spot (a white dot) may be displayed in the display region by an external force. The abnormal phenomenon of the display region may be defined as a bruising or the pooling phenomenon. For example, the abnormal phenomenon in the display region that occurs directly below the pressurized region may be defined as the bruising, and the abnormal phenomenon in the display region that occurs in the peripheral region to which the external force is applied may be defined as the pooling. The conductive plate 401 and the bracket 420 may have a capacitance value between two parallel conductive materials (e.g., the conductive plate 401 and the bracket 420) by the gap 499. The electronic device 200 may have different capacitance values depending on an assembly deviation and a tolerance of components when assembling the electronic device 200. Based on the different capacitance values, the radiation performance of the antenna (e.g., an antenna module 197 of FIG. 1) mounted on the electronic device 200 may not be constant.

According to an embodiment, the electronic device 200 may include the connecting member 430 disposed between the display module 410 and the bracket 420. The connecting member 430 may electrically connect the conductive plate 401 and the bracket 420 of the display module 410. The potentials of the bracket 420 and the conductive plate 401 connected through the connecting member 430 may be the same. For example, the conductive plate 401 connected to the bracket 420 operating as a ground portion may be grounded. The radiation performance of the antenna mounted inside the electronic device 200 may be improved through the grounded conductive plate 401.

According to an embodiment, the connecting member 430 may include the conductive material in order to electrically connect the conductive plate 401 and the bracket 420. The connecting member 430 may be in contact with the conductive plate 401 and may be in contact with the bracket 420. In case that the display 201 is the LCD, the connecting member 430 may include a conductive gasket having contractility for connecting the bracket with the conductive plate 401 supporting the display 201. For example, the connecting member 430 may include an elastic material. For example, the connecting member 430 may include a porous material (e.g., sponge) or the polymer material (e.g., polymer foam) having elasticity therein. The connecting member 430 may include the conductive material surrounding the elastic material. The conductive material may include a conductive tape or a conductive fiber.

According to an embodiment, the thickness of the uncompressed connecting member 430 may be thicker than the space of the gap 499. For example, the space between the conductive plate 401 and the bracket 420, which is the space of the gap 499 may be less than the distance from one surface of the connecting member 430 in contact with the conductive plate 401 to another surface of the connecting member 430 toward a structure 501.

According to an embodiment, the gap 499 may be approximately 0.2 mm to 0.4 mm. The thickness of the connecting member 430 may be approximately 0.3 mm to 0.5 mm. The connecting member 430 may be disposed between the gaps 499 and compressed or may be elastically supported by a structure (e.g., a groove or an opening) formed in the bracket 420.

According to an embodiment, in case that the connecting member 430 is compressed, in case that the display 201 is the LCD, the display 201 may include the white spot or the partially yellow tint (or yellow dot) in the display region. The connecting member 430 may need a structure that reduces a repulsive force in order to reduce defects in the display region of the display 201. The structure of FIGS. 5A to 8B to be described later may include a structure of the connecting member 430 that elastically supports the conductive plate 401 of the display 201.

According to the above-described embodiment, the electronic device 200 may reduce defects in the display 201 by including the connecting member 430 that elastically supports the display 410. The electronic device 200 may maintain the radiation performance of the antenna by electrically connecting the conductive plate 401 and the bracket 420 through the connecting member 430.

Figure 5A:
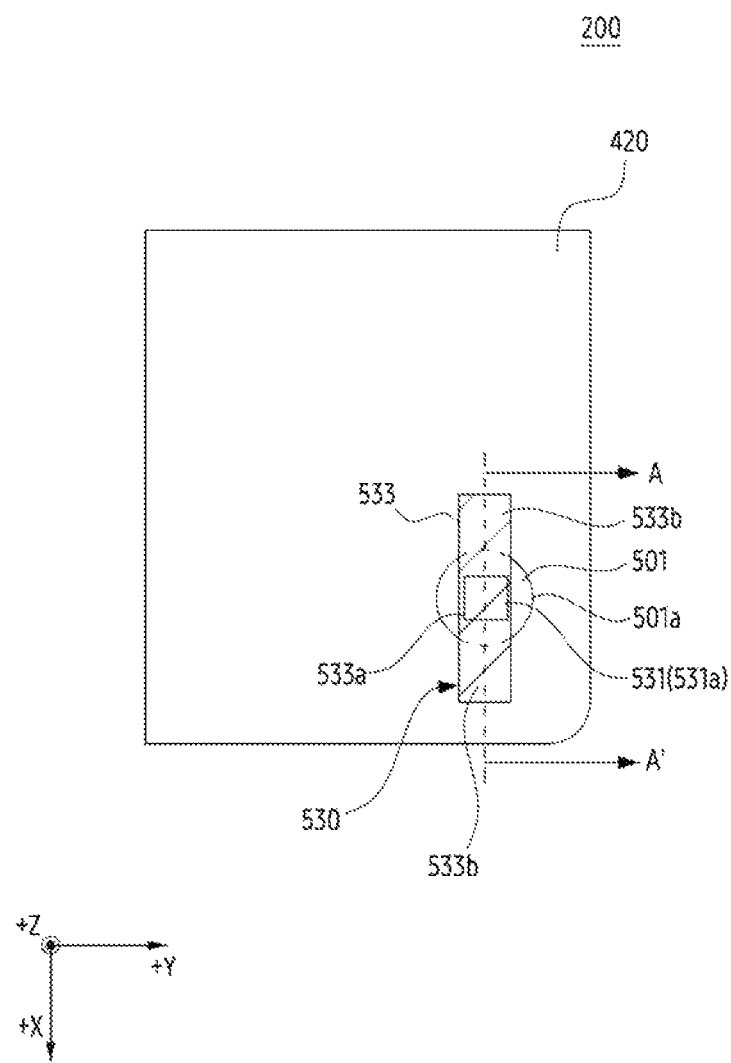
FIGS. 5A and 5B are plan views illustrating an exemplary connecting member disposed on a bracket according to an embodiment.
Figure 5B:
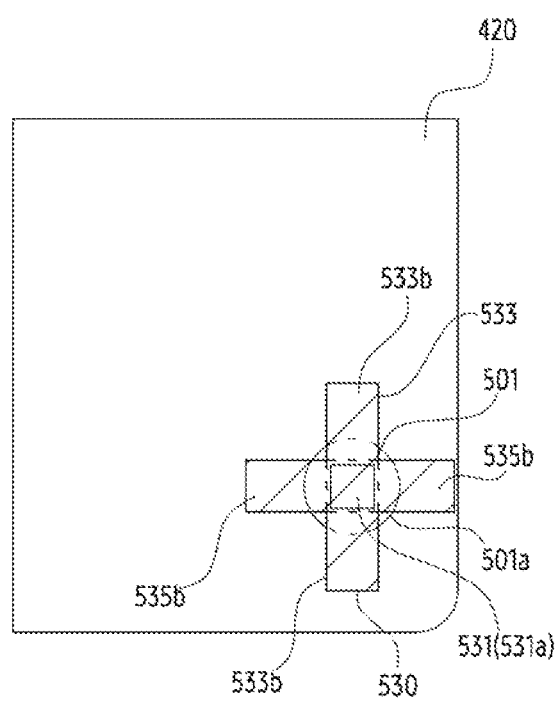
Figure 5B:
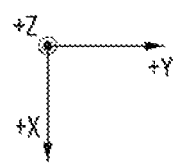
Figure 5C:
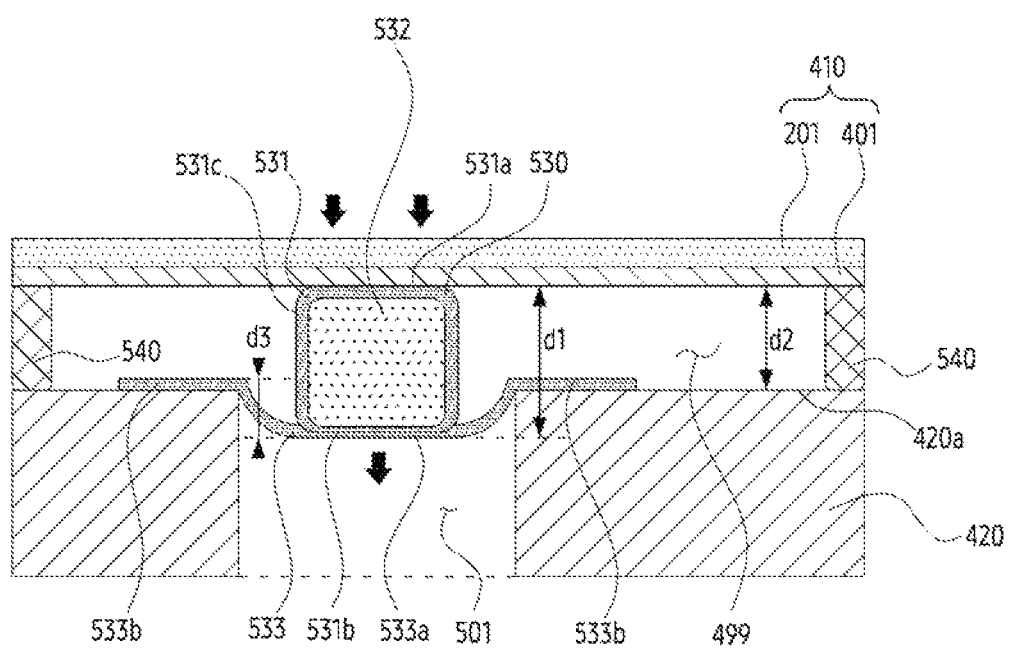
FIG. 5C is a cross-sectional view of an exemplary electronic device including a connecting member disposed between a bracket and a display module, according to an embodiment, is cut along A-A' of FIG. 5A.

FIGS. 5A and 5B are plan views illustrating an exemplary connecting member disposed on a bracket according to an embodiment. FIG. 5C is a cross-sectional view of an exemplary electronic device including a connecting member disposed between a bracket and a display module, according to an embodiment, cut along line A-A' of FIG. 5A.

Referring to FIGS. 5A-5C, an electronic device 200 may include a bracket 420 and a connecting member 530 (e.g., a connecting member 430 of FIG. 4). The bracket 420 may include a structure 501 that is at least partially removed into the bracket 420, from one surface 420a facing a display module 410 or a conductive plate 401. The structure 501 may include a groove (e.g., a recess) recessed from the one surface 420a of the bracket 420 or a hole passing through the bracket 420.

According to an embodiment, the connecting member 530 may be in contact with the conductive plate 401 and may cross the structure 501 along the one surface 420a of the bracket 420. The connecting member 530 may include a first conductive portion 531, a core 532, and a second conductive portion 533.

According to an embodiment, a portion of the first conductive portion 531 may be in contact with the conductive plate 401. The first conductive portion 531 may include an upper surface 531a facing the +Z axis direction, a lower surface 531b facing the −Z axis direction, and a side surface 531c disposed between the upper surface 531a and the lower surface 531b. For example, the upper surface 531a of the first conductive portion 531 may be in contact with the conductive plate 401. When a display 201 is viewed from above, the first conductive portion 531 may overlap the structure 501 including the groove or a through hole. For example, the first conductive portion 531 may be disposed to be corresponding to the structure 501. A portion of the lower surface 531b and the side surface 531c of the first conductive portion 531 may be inserted into the structure 501. For example, a portion of the side surface 531c of the first conductive portion 531 may be inserted into the inside of the structure 501 including the groove or the through hole. The lower surface 531b of the first conductive portion 531 may be inserted into the inside of the structure 501. A portion of the lower surface 531b or the side surface 531c of the first conductive portion 531 may be inserted into the structure 501 by pressing the conductive plate 401 after the electronic device 200 is assembled. A portion of the lower surface 531b or the side surface 531c of the first conductive portion 531 may be inserted into the inside of the structure 501 by the weight of the first conductive portion 531 when attached to the bracket 420. Except for a portion of the side surface 531c of the first conductive portion 531, the remaining portion of the side surface 531c, may be further inserted into the structure 501 by pressing the conductive plate 401 by assembling the electronic device 200. According to an embodiment, at least a portion of the side surface 531c of the first conductive portion 531 may face the inner surface of the structure 501. The side surface 531c of the first conductive portion 531 may be spaced apart from the inner surface of the structure 501. For example, a portion of the side surface 531c of the first conductive portion 531 inserted into the structure 501 may face the inner surface of the structure 501.

A portion of the side surface 531c of the first conductive portion 531 inserted into the structure 501 may be spaced apart from the inner surface of the structure 501. When the display 201 is viewed from above, an edge 501a of the structure 501 may surround the edge of the side surface 531c of the first conductive portion 531 or the lower surface 531b of the first conductive portion 531.

According to an embodiment, the first conductive portion 531 may protrude toward the display 201 or the conductive plate 401 from the second conductive portion 533 in contact with the bracket 420. The core 532 may be included inside the first conductive portion 531. A shape of the first conductive portion 531 may be defined by the core 532. The first conductive portion 531 may be surrounded along an outer surface of the core 532. The first conductive portion 531 may include a shape corresponding to the outer surface of the core 532. The core 532 may be formed to be thicker than the distance d2 in the Z axis direction of the gap 499. For example, the thickness of the core 532 in the Z axis direction may be thicker than the distance d2 in the Z axis direction of the gap 499. The core 532 may be formed in a rectangular parallelepiped, but is not limited thereto, and the core 532 may include a polygonal or elliptical circular surface in contact with the conductive plate 401. The first conductive portion 531 may have a polygonal columnar shape, an elliptical columnar shape, or a circular columnar shape based on the shape of the core 532. The core 532 may have a designated shape. The core 532 may include an elastic material or a rigid material depending on the position to be disposed.

According to an embodiment, the first conductive portion 531 may be integrally formed with the core 532. The first conductive portion 531 and the core 532 may be formed of the same material. For example, the first conductive portion 531 and the core 532 may include a conductive material. The first conductive portion 531 and the core 532 may be formed of metal.

According to an embodiment, the core 532 may be formed of a partially hollow metal. For example, the core 532 may be configured to have rigidity enough to maintain the shape of the first conductive portion 531. According to an embodiment, the core 532 may be formed of a porous material, and the first conductive portion 531 may be formed of the metal. For example, the core 532 may be formed of a material having elasticity.

According to an embodiment, the second conductive portion 533 may be in contact with the lower surface 531b of the first conductive portion 531. The second conductive portion 533 may include a support portion 533a and a wing portion 533b. The support portion 533a may be in contact with the first conductive portion 531. The wing portion 533b may extend along one surface of the bracket 420 from the support portion 533a. The second conductive portion 533 may have a band shape such as a tape. A width of the second conductive portion 533 in the Y axis direction may be equal to or greater than a width of the first conductive portion 531 in the Y axis direction. The second conductive portion 533 may support the first conductive portion 531. Both ends of the second conductive portion 533 may be in contact with the one surface 420a of the bracket 420 facing the display module 410. For example, the second conductive portion 533 may include the support portion 533a and the wing portion 533b. The support portion 533a may be in contact with the first conductive portion 531. The support portion 533a and the first conductive portion 531 may be adhered to each other through a conductive adhesive. The support portion 533a may support the first conductive portion 531.

The wing portion 533b may extend from both edges facing in opposite directions to each other among the edges of the support portion 533a. For example, the wing portion 533b may extend from the support portion 533a and be attached to the one surface 420a of the bracket 420. The wing portion 533b may be adhered to the bracket 420 through the conductive adhesive.

According to an embodiment, the connecting member 430 may electrically connect the conductive plate 401 and the bracket 420. For example, the first conductive portion 531 may be adhered to the conductive plate 401 through the conductive adhesive and may be electrically connected. The second conductive portion 533 may be adhered to the bracket 420 through the conductive adhesive and may be electrically connected. The first conductive portion 531 and the second conductive portion 533 may be connected to each other through the conductive adhesive. The second conductive portion 533 may be attached to a metal portion of the one surface 420a of the bracket 420. The connecting member 430 may electrically connect the conductive plate 401 electrically connected to the first conductive portion 531 and the bracket 420 electrically connected to the second conductive portion 533. According to an embodiment, the first conductive portion 531 and the second conductive portion 533 may be formed of conductive fibers. The second conductive portion 533 may have elasticity by being formed to have a thickness of approximately 0.05 mm.

According to an embodiment, the electronic device 200 may include the adhesive member (or supporter) 540. The adhesive member 540 may be disposed between the conductive plate 401 and the bracket 420. The adhesive member 540 may attach a portion of the conductive plate 401 and a portion of the bracket 420. For example, the adhesive member 540 may attach the conductive plate 401 and the bracket 420 in a state in which the conductive plate 401 and the bracket 420 are spaced apart from each other to have the gap 499. The conductive plate 401 and the bracket 420 may be spaced apart from each other by another structure inside the electronic device 200, and the adhesive member 540 may attach the conductive plate 401 and the bracket 420. The distance d1 in the Z axis direction of the connecting member 530 may be greater than the distance d2 in the Z axis direction of the gap 499. The distance d2 of the gap 499 may be determined based on a height of an adhesive member 540. The adhesive member 540 may be referred to as a supporter in terms of spacing the conductive plate 401 and the bracket 420 apart and supporting the conductive plate 401. The supporter may have a height of approximately 0.3 mm to 0.5 mm. A portion of the connecting member 530, which is thicker than the distance d2 of the gap 499, may be disposed in the structure 501. The distance d3 in the Z axis direction of a portion of the connecting member 530 disposed in the structure 501 may be a difference between the distance d1 in the Z axis direction of the connecting member 530 and the distance d2 in the Z axis direction of the gap. Since the connecting member 530 is not compressed, it may have a relatively small repulsive force transmitted to the display 201.

Referring to FIG. 5B, the connecting member 430 may include a third conductive portion 535b. When the display 201 is viewed from above, the third conductive portion 535b may cross at least a portion of an overlapping region between the second conductive portion 533 and the structure 501. According to an embodiment, the third conductive portion 535b may be integrally formed with the second conductive portion 533. The third conductive portion 535b may extend in a direction substantially perpendicular to the extending direction of the second conductive portion 533. The third conductive portion 535b may extend along the one surface 420a of the bracket 420 from the edge 501a of the structure 501. A portion of the third conductive portion 535b may be in contact with the one surface 420a of the bracket 420. For example, both ends of the third conductive portion 535b may be attached to the one surface 420a of the bracket 420 through the conductive tape. The third conductive portion 535b may be electrically connected to the bracket 420 through the conductive tape. The third conductive portion 535b may be integrally formed with the first conductive portion 531 and the second conductive portion 533. The third conductive portion 535b may be formed of the same material as the first conductive portion 531 and the second conductive portion 533. For example, the third conductive portion 535b may include conductive fiber.

According to the above-described embodiment, the electronic device 200 may elastically support the display 201 or the conductive plate 401 through the connecting member 430 disposed on the structure 501 comprising a groove or a through hole. The connecting member 430 may electrically connect the conductive plate 401 and the bracket 420 based on the electrical connection between the first conductive portion 531 and the conductive plate 401 and the electrical connection between the second conductive portion 533 and the bracket 420. The electronic device 200 may remove capacitance affecting the radiation performance of the antenna module through the electrically connected conductive plate 401 and the bracket 420.

According to an embodiment, the connecting member 530 may reduce unintended phenomena (e.g., yellowing, white spot, or wavy pattern) displayed on the display 201 of the display module 410 while providing a stable electrical connection structure. The connecting member 530 may be disposed on the structure 501 to elastically support the display 201. In the structure 501, a portion of the first conductive portion 531 and the core 532 may be disposed. The first conductive portion 531 and the core 532 may be elastically supported on the bracket 420. The first conductive portion 531 and the core 532 may flow into the structure 501. The connecting member 530 may provide a relatively low repulsive force to the display module 410 based on the flow of the first conductive portion 531 and the core 532. With the relatively low repulsive force, the electronic device 200 may reduce defects displayed in the display region of the display 201.

Figure 6:
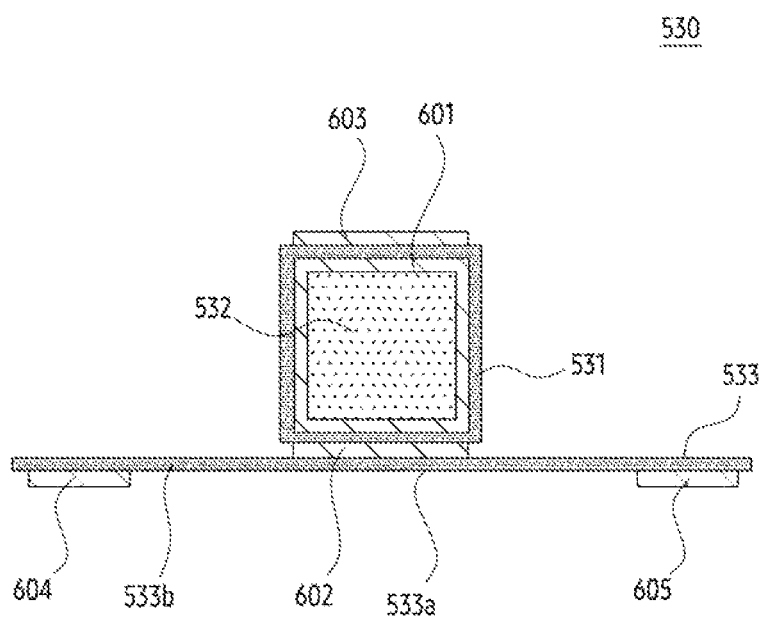
FIG. 6 is a cross-sectional view of an exemplary connecting member according to an embodiment.

FIG. 6 is a cross-sectional view of an exemplary connecting member according to an embodiment.

Referring to FIG. 6, a connecting member 530 may include a first conductive portion 531, a core 532, and a second conductive portion 533.

According to an embodiment, the first conductive portion 531 may be formed in a square columnar shape. The first conductive portion 531 may be formed in a hollow square columnar shape. The first conductive portion 531 may have a thickness of approximately 0.03 mm to 0.05 mm. The first conductive portion 531 may be formed of a conductive fiber. For example, the first conductive portion 531 may be formed by weaving or tying a plurality of conductive fibers together. The core 532 may be disposed inside the first conductive portion 531. The first conductive portion 531 and the core 532 may be disposed between a conductive plate (e.g., a conductive plate 401 of FIG. 4) and a bracket (e.g., a bracket 420 of FIG. 4) and may be referred to as a conductive gasket in terms of electrically connecting the conductive plate 401 and the bracket 420. The core 532 may form an outer shape of the conductive gasket formed of the first conductive portion 531 and the core 532. For example, the outer shape of the first conductive portion 531 may substantially correspond to the shape of the core 532.

According to an embodiment, an inner surface of the first conductive portion 531 may be attached to an outer surface of the core 532. For example, an adhesive member 601 may be interposed between the inner surface of the first conductive portion 531 and the core 532. The adhesive member 601 may be applied along the outer surface of the core 532 and may attach the first conductive portion 531 to the core 532. According to an embodiment, the combined height of the core 532 and the adhesive member 601 may be approximately 0.3 mm to about 0.5 mm. The core 532 may be formed of a polymer material such as a foam or a sponge made of a porous material. However, the disclosure is not limited thereto. For example, the core 532 may be formed of the same material as the first conductive portion 531.

According to an embodiment, the first conductive portion 531 may be integrally formed with the core 532. For example, the first conductive portion 531 may be formed in a filled column shape. The first conductive portion 531 and the core 532 may be formed of one member and may be formed of a metal material having rigidity.

According to an embodiment, the second conductive portion 533 may support the conductive gasket formed of the first conductive portion 531 and the core 532. For example, the first conductive portion 531 may be disposed on the second conductive portion 533. According to an embodiment, the second conductive portion 533 may be formed of conductive fiber. For example, the second conductive portion 533 may be formed by weaving or tying a plurality of conductive fibers together. A thickness of the second conductive portion 533 may be approximately 0.05 mm.

According to an embodiment, the connecting member 530 may include a first conductive tape 602 for electrically connecting the first conductive portion 531 and the second conductive portion 533 to each other. The first conductive tape 602 may be disposed between the first conductive portion 531 and the second conductive portion 533. The first conductive tape 602 may electrically connect the first conductive portion 531 and the second conductive portion 533 and may attach the first conductive portion 531 to the second conductive portion 533.

According to an embodiment, the connecting member 530 may provide conductive tapes 603, 604, and 605 for providing physical and electrical connection between the connecting member 530 and structures or electronic components disposed inside an electronic device (e.g., the electronic device 200 of FIG. 4).

According to an embodiment, one surface of the second conductive tape 603 may be disposed on the first conductive portion 531. Another surface of the second conductive tape 603 may be disposed on the conductive plate 401. The second conductive tape 603 may be interposed between the conductive plate 401 and the first conductive portion 531 to electrically connect the conductive plate 401 including a conductive material to the first conductive portion 531.

According to an embodiment, one surface of the third conductive tapes 604 and 605 may be disposed on the second conductive portion 533. Another surface of the third conductive tapes 604 and 605 may be disposed on the bracket 420. The third conductive tapes 604 and 605 may be interposed between the bracket 420 and the second conductive portion 533 to electrically connect the bracket 420 including the conductive material and the second conductive portion 533.

Figure 7A:
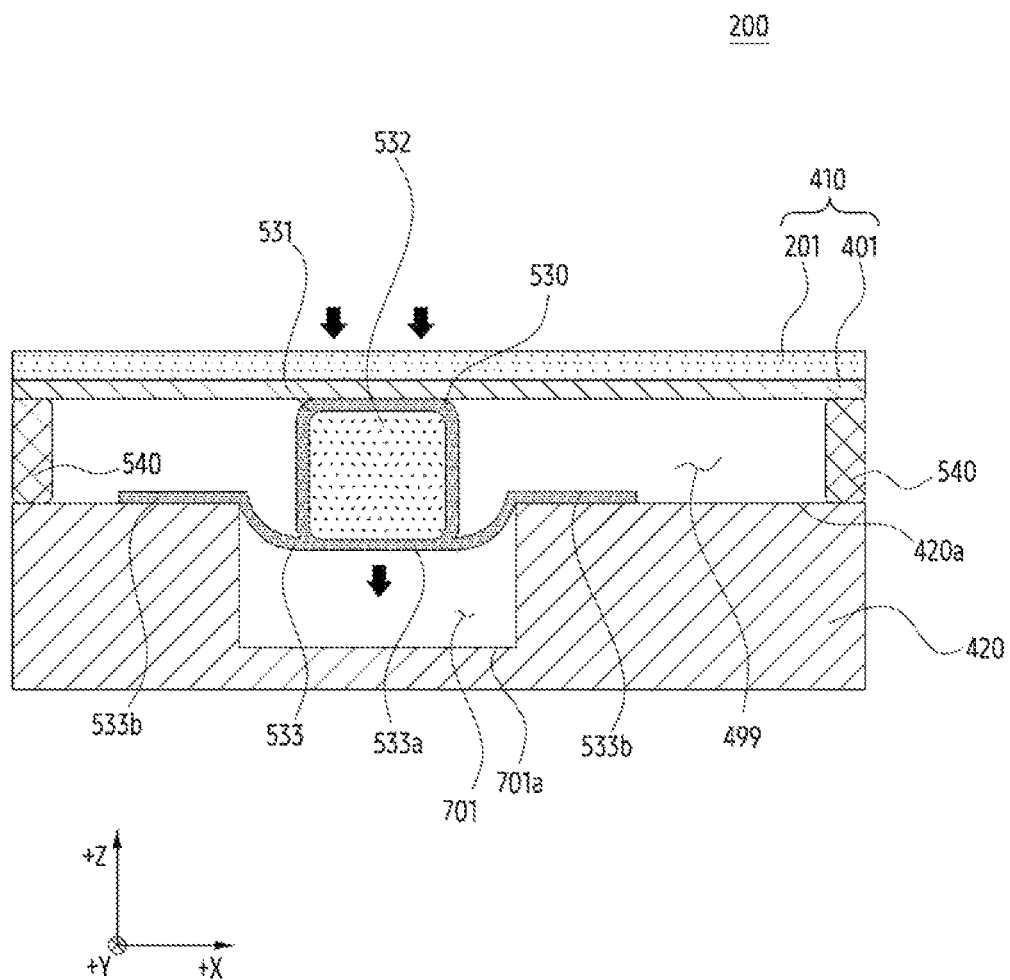
FIGS. 7A and 7B are cross-sectional views of an exemplary electronic device including a connecting member disposed between a modified bracket and a display module, according to an embodiment.
Figure 7B:
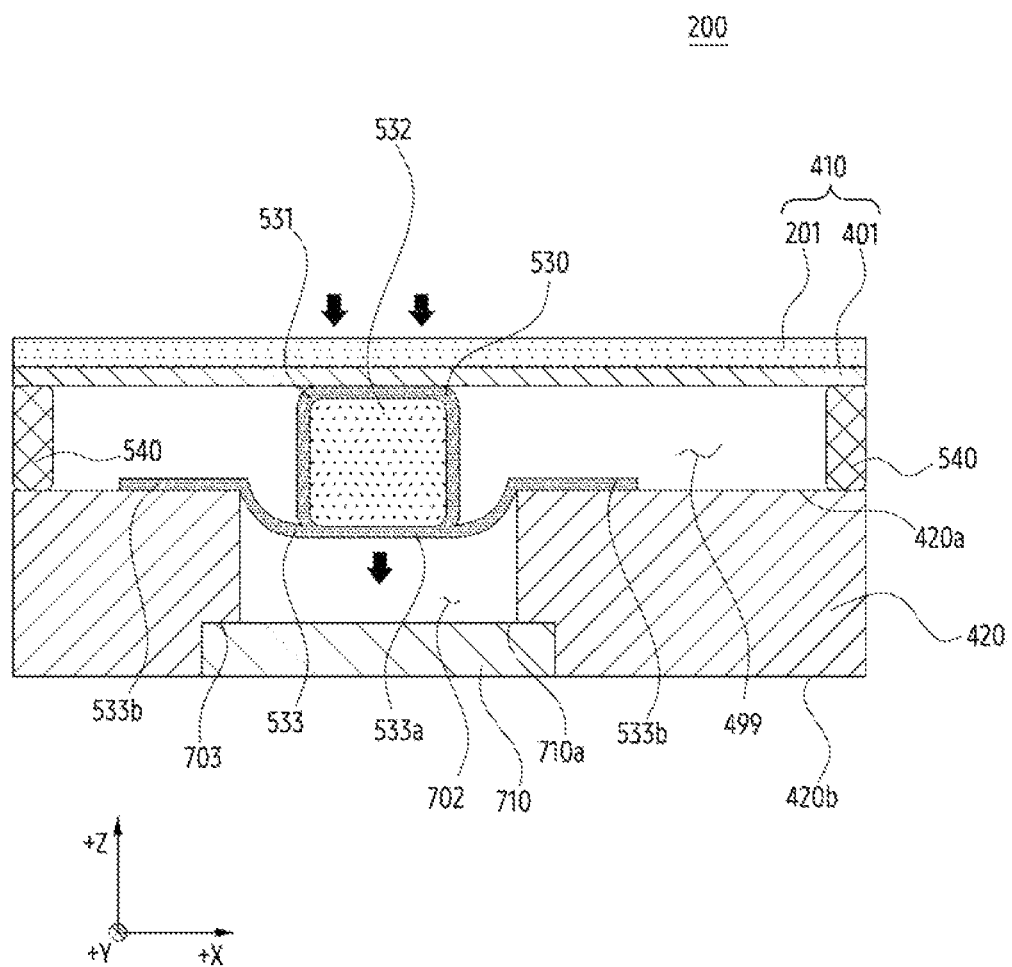

FIGS. 7A and 7B are cross-sectional views of an exemplary electronic device including a connecting member disposed between a modified bracket and a display module, according to one embodiment.

Referring to FIGS. 7A and 7B, an electronic device 200 may include a display module 410, a bracket 420, and a connecting member 530 (e.g., a connecting member 430 of FIG. 4). The bracket 420 may include a groove 701 or a through hole 702 that is at least partially removed from one surface 420a facing the display 201 into the inside of the bracket 420.

According to one embodiment, the connecting member 530 may be in contact with a conductive plate 401 and may cross the groove 701 or the through hole 702 along the one surface 420a of the bracket 420. The connecting member 530 may include a first conductive portion 531, a core 532, and a second conductive portion 533.

According to an embodiment, the first conductive portion 531 may be in contact with the conductive plate 401. When the display 201 is viewed from above, the first conductive portion 531 may overlap the groove 701 or the through hole 702. For example, a portion of the first conductive portion 531 may be inserted into the groove 701 or the through hole 702. For example, a portion of the first conductive portion 531 may be inserted into the inside of the groove 701 or the through hole 702. When the display 201 is viewed from above, the edge of the groove 701 may surround the side surface of the first conductive portion 531 or the edge of one surface of the first conductive portion 531 in contact with the second conductive portion 533.

According to an embodiment, the first conductive portion 531 may protrude toward the display 201 or the conductive plate 401 from the second conductive portion 533 in contact with the bracket 420. The core 532 may be included in the first conductive portion 531.

According to an embodiment, the second conductive portion 533 may extend along the one surface 420a of the bracket 420 from an edge of the first conductive portion 531. The second conductive portion 533 may extend with a width like a tape. The second conductive portion 533 may be disposed across the groove 701 or the through hole 702. For example, one end of the second conductive portion 533 may be attached to the one surface 420a of the bracket 420, and the second conductive portion 533 may extend from the one end of the second conductive portion 533 toward the groove 701 or the through hole 702. The extended second conductive portion 533 may cross the groove 701 or the through hole 702 and extend to another end of the second conductive portion 533. Another end of the second conductive portion 533 may face an opposite direction toward which one end of the second conductive portion 533 faces, and may be attached to the one surface 420a of the bracket 420. The width of the second conductive portion 533 may be equal to or wider than the width of the first conductive portion 531. The second conductive portion 533 may support the first conductive portion 531. The second conductive portion 533 may include a support portion 533a and a wing portion 533b. The support portion 533a may support the first conductive portion 531. The wing portion 533b may extend along the one surface 420a of the bracket 420 from an edge of the support portion 533a. The wing portion 533b may be formed at both ends of the second conductive portion 533. For example, the wing portion 533b may be formed of a plurality of portions, a portion of the wing portion 533b may be disposed at one end of the second conductive portion 533, and another portion of the wing portion 533b may be disposed at another end of the second conductive portion 533.

According to an embodiment, the connecting member 430 may electrically connect the conductive plate 401 and the bracket 420. For example, the connecting member 430 may electrically connect the conductive plate 401 electrically connected to the first conductive portion 531 and the bracket 420 electrically connected to the second conductive portion 533.

According to an embodiment, the electronic device 200 may include a supporter. The supporter may be disposed between the conductive plate 401 and the bracket 420. The supporter may be configured to space the conductive plate 401 from the bracket 420 apart.

According to an embodiment, the electronic device 200 has been described as having the groove 701 or the through hole 702, but may include various structures. For example, the electronic device 200 may include a structure capable of providing elasticity instead of the groove 701 or the through hole 702.

Referring to FIG. 7A, according to an embodiment, the connecting member 530 including the first conductive portion 531, the core 532, and the second conductive portion 533 may be spaced apart from a bottom surface 701a of the groove 701. The connecting member 530 may be configured to be spaced apart from the bottom surface 701a of the groove 701 even when an external force is applied from the outside. The connecting member 530 which maintains being spaced apart from the bottom surface 701a may reduce a repulsive force toward the display 201 and the conductive plate 401 even when pressed by the external force.

Referring to FIG. 7B, the electronic device 200 according to an embodiment may further include a printed circuit board 710. The printed circuit board 710 may be disposed on a portion of the bracket 420. The printed circuit board 710 may be disposed on another surface 420b facing the one surface 420a of the bracket 420.

According to an embodiment, the bracket 420 may further include a seating groove 703 for seating the printed circuit board 710. The seating groove 703 may be recessed toward the display 201 from another surface 420b of the bracket 420. The seating groove 703 may be connected to the through hole 702. A portion of the printed circuit board 710 seated in the seating groove 703 may be exposed in a direction toward the display 201 through the through hole 702.

According to an embodiment, the connecting member 530 including the first conductive portion 531, the core 532, and the second conductive portion 533 may be spaced apart from one surface 710a of the printed circuit board 710 inside the through hole 702. The connecting member 530 may be configured to be spaced apart from the one surface 710a of the printed circuit board 710 even when the external force is applied from the outside. The connecting member 530 which maintains being spaced apart from the one surface 710a of the printed circuit board 710 may reduce the repulsive force toward the display 201 and the conductive plate 401 even when pressed by the external force.

According to the above-described embodiment, the connecting member 530 may electrically connect the first conductive portion 531 and the conductive plate 401, and may electrically connect the second conductive portion 533 and the bracket 420 in order to provide a stable current flow structure. The electronic device 200 may improve the radiation performance of the antenna by reducing capacitance by the first conductive portion 531 and the conductive plate 401 through the connecting member 530. The connecting member 530 may reduce unintended pattern displayed on the display 201 of the display module 410 while providing the stable current flow structure. The connecting member 530 may be disposed on the same structure as the groove 701 to stably support the display 201. In the groove 701, a portion of the first conductive portion 531, the core 532, and the second conductive portion 533 may be disposed. The first conductive portion 531 and the core 532 may be elastically supported on the bracket 420 based on the second conductive portion 533. For example, when the external force (e.g., touch or pressing of a finger) applied from the outside of the display module 410 is applied, the first conductive portion 531 and the core 532 may move to the inner space of the groove 701. The connecting member 530 may provide a relatively low repulsive force to the display module 410 by the movement of the first conductive portion 531 and the core 532. For example, in case that the first conductive portion 531 and the core 532 of the connecting member 530 are disposed on the one surface 420a of the bracket 420, the connecting member 530 may not move inside the bracket 420 due to the pressure of the external force, and thus may provide a high repulsive force to the display module 410. In the display region of the display module 410 to which the high repulsive force is applied, the yellowing, the white spot, or the wavy pattern may be displayed.

Figure 8A:
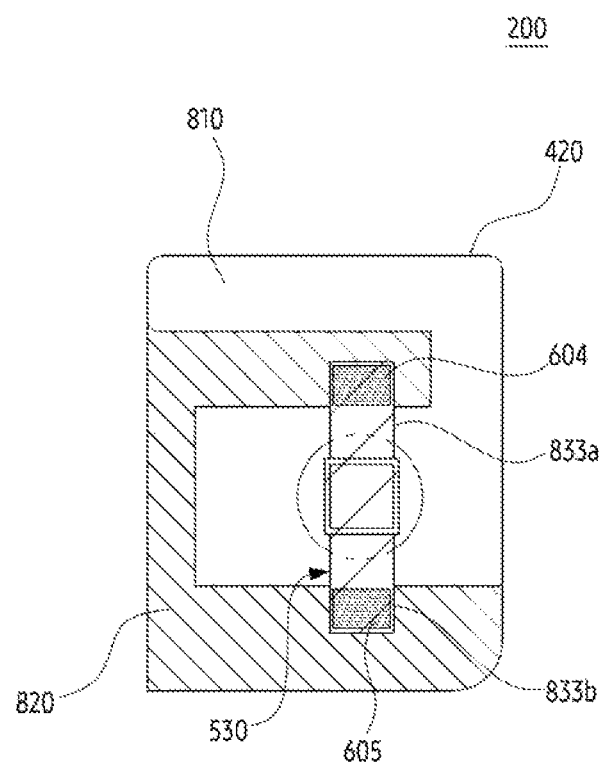
FIGS. 8A and 8B are diagrams illustrating an exemplary disposition of a connecting member disposed on a bracket including heterogeneous materials according to an embodiment.
Figure 8B:
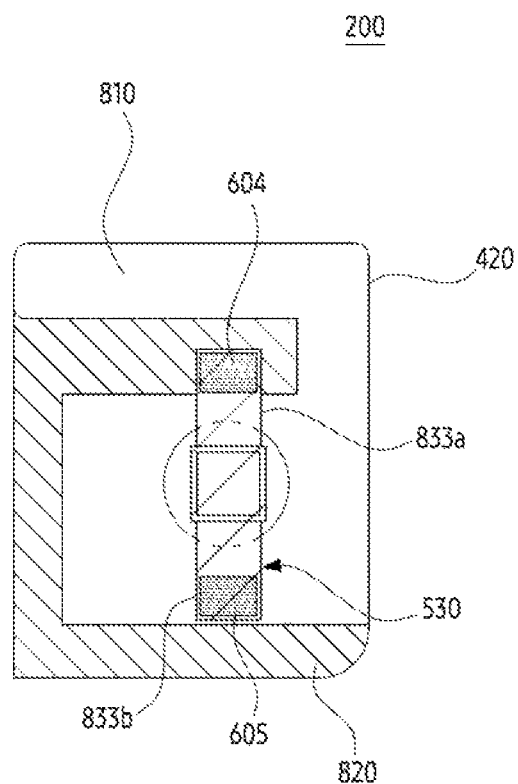

FIGS. 8A and 8B are diagrams illustrating an exemplary disposition of a connecting member disposed on a bracket including heterogeneous materials according to an embodiment.

Referring to FIGS. 8A and 8B, an electronic device 200 may include a bracket 420 and a connecting member 530. The bracket 420 may include a non-conductive region 810 and a conductive region 820. The non-conductive region 810 may include a non-conductive material (e.g., a polymer material or a plastic material). The conductive region 820 may include a conductive material (e.g., metal). Although the bracket 402 has been described as including a heterogeneous material, it is not limited thereto and may include only the conductive region 820.

According to an embodiment, the conductive region 820 of the bracket 420 may be electrically connected to the ground portion of the electronic device 200. A second conductive portion (e.g., a second conductive portion 533 of FIG. 5A) of the connecting member 530 may include a plurality of wing portions (e.g., a wing portion 533b of FIG. 5A). The plurality of wing portions may include a first wing portion 833a and a second wing portion 833b. The first wing portion 833a and the second wing portion 833b may be attached to the bracket 420 by third conductive tapes 604 and 605.

According to an embodiment, when the bracket 420 is viewed from above, at least a portion of the first wing portion 833a and the second wing portion 833b may overlap the conductive region 820 of the bracket 420. The first wing portion 833a may be attached to the conductive region 820 of the bracket 420 by one third conductive tape 604 among the third conductive tapes 604 and 605. The second wing portion 833b may be attached to the conductive region 820 of the bracket 420 by another one third conductive tape 605 among the third conductive tapes 604 and 605.

The connecting member 530 including the wing portions 833a and 833b attached to the conductive region 820 of the bracket 420 by the third conductive tapes 604 and 605 may be electrically connected to the conductive region 820. The connecting member 530 may electrically connect the conductive region 820 of the bracket 420 and a conductive plate (e.g., a conductive plate 401 of FIG. 4).

Referring to FIG. 8B, according to an embodiment, when the bracket 420 is viewed from above, one of the first wing portion 833a and the second wing portion 833b may overlap the conductive region 820 of the bracket 420, and the other may overlap the non-conductive region 810 of the bracket 420. For example, the first wing portion 833a may be attached to the conductive region 820 of the bracket 420 by one third conductive tape 604 among the third conductive tapes 604 and 605. The second wing portion 833b may be attached to the non-conductive region 810 of the bracket 420 by another one third conductive tape 605 among the third conductive tapes 604 and 605. According to an embodiment, the third conductive tape 605 attached to the non-conductive region 810 may be replaced with an adhesive material. For example, the adhesive material may be a tape to which an adhesive material not including a conductive particle is applied.

The connecting member 530 including the first wing portion 833a attached to the conductive region 820 of the bracket 420 by the third conductive tapes 604 and 605 may be electrically connected to the conductive region 820. The connecting member 530 may electrically connect the conductive region 820 of the bracket 420 and the conductive plate (e.g., the conductive plate 401 of FIG. 4).

According to the above-described embodiment, the connecting member 530 may electrically connect the first conductive portion 531 and the conductive plate 401 and may electrically connect the second conductive portion 533 and the bracket 420 in order to provide a stable current flow structure. In order to electrically connect the second conductive portion 533 and the bracket 420, at least one of the wing portions 833a and 833b may be attached to the conductive region 820 of the bracket 420 through the conductive tape. The electronic device 200 may improve the radiation performance of the antenna by reducing the capacitance by the first conductive portion 531 and the conductive plate 401 through the connecting member 530.

An electronic device (e.g., an electronic device 200 of FIG. 5C) according to the above-described embodiment may comprise a display (e.g., the display 201 of FIG. 5C). The electronic device may comprise a conductive plate (e.g., a conductive plate 401 of FIG. 5C). The conductive plate may support the display. The electronic device may further comprise a bracket (e.g., a bracket 420 of FIG. 5C). The bracket may comprise a structure (e.g., a structure 501 of FIG. 5C) in which at least a portion thereof is recessed inward from one surface facing the display. The bracket may be spaced apart from the conductive plate. According to an embodiment, the electronic device may further comprise a connecting member (e.g., a connecting member 530 of FIG. 5C). A portion of the connecting member may be in contact with the conductive plate, and the connecting member may cross the structure along the one surface of the bracket. The electronic device may further comprise a conductive tape (e.g., third conductive tapes 604 and 605 of FIG. 6). The conductive tape may be interposed between the connecting member and the bracket. According to an embodiment, the connecting member may include a first conductive portion (e.g., a first conductive portion 531 of FIG. 5C) and a second conductive portion (e.g., a second conductive portion 533 of FIG. 5C). At least a portion of the first conductive portion may be in contact with the conductive plate. The first conductive portion may be disposed in the structure when the display is viewed from above. The second conductive portion, from the first conductive portion, may be disposed on one surface of the bracket, and an end may be fixed to the bracket by the conductive tape. The connecting member may be disposed to electrically connect the conductive plate and the frame. According to an embodiment, the first conductive portion may be partially inserted into the structure by pressing the conductive plate.

According to the above-described embodiment, the electronic device may elastically support the display or the conductive plate through the connecting member disposed on the structure having the groove or the through hole. The connecting member may electrically connect the conductive plate and the bracket based on the electrical connection between the first conductive portion and the conductive plate and the electrical connection between the second conductive portion and the bracket. The electronic device may remove capacitance affecting radiation performance of the antenna module through the electrically connected conductive plate and the bracket.

According to an embodiment, at least a portion of the side surface of the first conductive portion may face an inner surface of the structure. According to an embodiment, the side surface of the first conductive portion may be spaced apart from the inner surface of the structure.

According to the above-described embodiment, a portion of the first conductive portion may be inserted into the inside of the structure, so that the connecting member may elastically support the display or the conductive plate. The electronic device may reduce defects displayed on the display region of the display through the connecting member.

According to an embodiment, a gap between the conductive plate and the bracket may be smaller than a thickness of the first conductive portion.

According to the above-described embodiment, the thickness of the first conductive portion or the connecting member may be formed to smaller than a space between the bracket and the conductive plate, thereby stably maintaining the electrical connection.

According to an embodiment, a portion of the second conductive portion contacting the first conductive portion may be disposed inside the structure and may elastically support the first conductive portion.

The second conductive portion may elastically support the first conductive portion, thereby reducing the influence by the external force of the display.

According to an embodiment, the electronic device may include a supporter (e.g., an adhesive member 540 of FIG. 5C) disposed between the conductive plate and the bracket. According to an embodiment, the for the flow of the display, the supporter may form a gap (e.g., a gap 499 of FIG. 5C) by spacing between the conductive plate and the bracket apart.

According to an embodiment, the first conductive portion may include a core (e.g., a core 532 of FIG. 5C) providing a shape of the first conductive portion. The first conductive portion may be formed of a conductive fiber.

According to the above-described embodiment, the first conductive portion may be formed of conductive fiber to provide a shape corresponding to the core along the outer surface of the core.

According to an embodiment, the core may include a metal material to support the conductive plate and maintain the shape of the first conductive portion.

According to the above-described embodiment, the core may have rigidity by including a metal material. The core may be integrally formed with the first conductive portion or may be bonded to the first conductive portion.

According to an embodiment, the core may include an elastic material deformable by the external force.

According to the above-described embodiment, the core may be formed of the elastic material to elastically support the display or the conductive plate. By including the core, the electronic device may reduce defects of the display due to external force.

According to an embodiment, the second conductive portion may include a conductive fiber configured to be electrically connected to the bracket.

According to the above-described embodiment, the second conductive portion including the conductive fiber may be configured to be deformable by the external force, and thus may elastically support the display or the conductive plate through the first conductive portion.

According to an embodiment, the connecting member may further include a third conductive portion. The third conductive portion may cross the structure when the display is viewed from above. The third conductive portion may cross the second conductive portion. According to an embodiment, the connecting member may include another conductive tape. The other conductive tape may connect a wing portion of the third conductive portion and one surface of the bracket.

The electronic device according to the above-described embodiment may lower resistance by including the third conductive portion. The third conductive portion may elastically support the first conductive portion together with the second conductive portion.

According to an embodiment, the first conductive portion may be interposed between the conductive plate and the second conductive portion. According to an embodiment, the connecting member may electrically connect the conductive plate and the bracket through the first conductive portion and the second conductive portion.

The electronic device may improve performance of a wireless signal transmitted from an antenna by electrically connecting the bracket and the conductive plate through the first conductive portion and the second conductive portion.

According to an embodiment, the structure may include a concave groove from one surface of the bracket by removing a portion of the bracket, and a portion inserted into the groove among the first conductive portion and the second conductive portion may be spaced apart from a bottom surface of the groove.

According to the above-described embodiment, the connecting member of the electronic device may be maintained in a floating state while being spaced apart from the bottom surface. The connecting member may elastically support the display or the conductive plate. The connecting member elastically supporting the display module may reduce defects of the display region of the display that may be displayed by the external force.

According to an embodiment, the structure may be a through hole passing from one surface of the bracket to another surface of the bracket. The electronic device may include a printed circuit board (e.g., a printed circuit board 710 of FIG. 7B). The printed circuit board may be disposed at one end of the through hole formed on another surface. A portion inserted into the through hole among the first conductive portion and the second conductive portion may be spaced apart from the printed circuit board.

According to the above-described embodiment, the connecting member of the electronic device may be maintained in a floating state while being spaced apart from the printed circuit board. The connecting member may elastically support the display or the conductive plate. The connecting member elastically supporting the display module may reduce defects of the display region of the display that may be displayed by the external force.

According to an embodiment, the first conductive portion may be attached to the conductive plate through another conductive tape that is different from the conductive tape and disposed between the conductive plate and the first conductive portion. The first conductive portion may be electrically connected to the conductive plate.

According to an embodiment, the first conductive portion may move into the inside of the structure by an external force applied toward the display.

According to the above-described embodiment, the connecting member of the electronic device may be configured in a state movable into the inside of the structure. The connecting member configured in a movable state may elastically support the display or the conductive plate. The connecting member elastically supporting the display module may reduce defects of the display region of the display that may be displayed by the external force.

According to an embodiment, the electronic device (e.g., the electronic device 200 of FIG. 5C) may include the conductive plate (e.g., the conductive plate 401 of FIG. 5C) disposed on a surface facing the inside of the electronic device. The electronic device may include the display (e.g., the display 201 of FIG. 5C). A surface of the display facing the inside of the electronic device may contact the conductive plate. The electronic device may include the bracket (e.g., the bracket 420 of FIG. 5C) including a structure at least partially removed from one surface facing the display to the inside. According to an embodiment, the electronic device may further include the supporter (e.g., the adhesive member 540 of FIG. 5C) that forms a gap between the display and the bracket by being disposed between the display and the bracket.

According to an embodiment, an electronic device may comprise a connecting member crossing the structure along the one surface of the bracket, a portion of the connecting member in contact with the conductive plate. According to an embodiment, the first conductive tape (e.g., at least one of the third conductive tapes 604 or 605 of FIG. 6) disposed between the connecting member and the bracket may be further included. According to an embodiment, the second conductive tape (e.g., the second conductive tape 603 of FIG. 6) disposed between the portion of the connecting member and the conductive plate may be further included.

According to an embodiment, when the display is viewed from above, the connecting member may include the first conductive portion (e.g., the first conductive portion 531 of FIG. 5C) overlapping the structure and attached to the conductive plate by the second conductive tape. The connecting member may further include the second conductive portion (e.g., the second conductive portion 533 of FIG. 5C) extending from the first conductive portion along one surface of the bracket and having an end attached to the bracket by the second conductive tape. The connecting member may electrically connect the conductive plate and the bracket.

According to an embodiment, a portion of the first conductive portion may be inserted into the structure.

According to the above-described embodiment, the electronic device may elastically support the display or the conductive plate through the connecting member disposed on the structure having the groove or the through hole. The connecting member may electrically connect the conductive plate and the bracket based on the electrical connection between the first conductive portion and the conductive plate and the electrical connection between the second conductive portion and the bracket. The electronic device may remove capacitance affecting radiation performance of the antenna module through the electrically connected conductive plate and the bracket.

According to an embodiment, a height of the supporter may be smaller than a distance from one surface of the first conductive portion in contact with the conductive plate to another surface of the first conductive portion facing the structure.

According to the above-described embodiment, the thickness of the first conductive portion or the connecting member may be formed to smaller than a space between the bracket and the conductive plate, thereby stably maintaining the electrical connection.

According to an embodiment, at least a portion of the side surface of the first conductive portion may face the inner surface of the structure and may be spaced apart from the inner surface of the structure.

The second conductive portion may elastically support the first conductive portion, thereby reducing the influence by the external force of the display.

The electronic device according to various embodiments disclosed in the present document may be various types of devices. The electronic device may include, for example, a portable communication device (e.g., a smartphone), a computer device, a portable multimedia device, a portable medical device, a camera, a wearable device, or a home appliance. The electronic device according to an embodiment of the present document is not limited to the above-described devices.

The various embodiments and terms used herein are not intended to limit the technical features described herein to specific embodiments and should be understood to include various modifications, equivalents, or substitutes of the embodiment. With respect to the description of the drawings, similar reference numerals may be used for similar or related components. The singular form of the noun corresponding to the item may include one or more of the items unless clearly indicated differently in a related context. Herein, the expression "at least one of a, b or c" indicates "only a", "only b", "only c", "both a and b", "both a and c", "both b and c", or "all of a, b, and c". Terms such as "first", "second", or "second", or "second" may be used simply to distinguish a corresponding component from another corresponding component, and are not limited to other aspects (e.g., importance or order). When some (e.g., the first) component is referred to as "coupled" or "connected" in another (e.g., the second) component, with or without the term "functional" or "communicatively", it means that some of the components can be connected directly (e.g., wired), wirelessly, or through a third component.

The term "module" used in various embodiments of the present document may include a unit implemented in hardware, software, or firmware and be used interchangeably with terms such as logic, logic block, component, or circuitry, for example. The module may be a minimum unit or a part of the integrally configured component or the component that performs one or more functions. For example, according to an embodiment, the module may be implemented in the form of an application-specific integrated circuit (ASIC).

Various embodiments of the present document may be implemented as software (e.g., a program) including one or more instructions stored in a storage medium (or external memory) readable by a device (e.g., wearable device 101). For example, a processor (e.g., a processor) of a device (e.g., wearable device 101) may call and execute at least one of the one or more instructions stored from a storage medium. This makes it possible for the device to operate to perform at least one function according to at least one command called. The one or more instructions may include code generated by a compiler or code that may be executed by an interpreter. The device-readable storage medium may be provided in the form of a non-transitory storage medium. Here, the term "non-transitory" only means that a storage medium is a device that is tangible and does not include a signal (e.g., electromagnetic wave), and the term does not distinguish between a case where data is semi-permanently stored and a case where it is temporarily stored.

According to an embodiment, a method according to various embodiments disclosed in the present document may be provided by being included in a computer program product. The computer program products may be traded between sellers and buyers as products. The computer program products may be distributed in the form of device-readable storage media (e.g., compact disc read only memory (CD-ROM), or distributed (e.g., downloaded or uploaded) directly or online through an application store (e.g., Play Store™) or between two user devices (e.g., smartphones). In the case of online distribution, at least some of the computer program products may be temporarily stored or temporarily created on a device-readable storage medium such as a manufacturer's server, a server in an application store, or a memory in a relay server.

According to various embodiments, each of the above-described components (e.g., a module or a program) may include a single object or a plurality of objects, and some of the plurality of objects may be separated and disposed in other components. According to various embodiments, one or more components or operations of the above-described corresponding components may be omitted, or one or more other components or operations may be added. Alternatively, or additionally, a plurality of components (e.g., modules or programs) may be integrated into one component. In this case, the integrated component may perform one or more functions of each of the components in the same or similar manner as those performed by the corresponding component among the plurality of components before the integration. According to various embodiments, operations performed by a module, a program, or other components may be executed sequentially, in parallel, repeatedly, or heuristic, performed in a different order, omitted, or one or more other operations may be added.

What is claimed is:

1. An electronic device comprising:
   a display;
   a conductive plate disposed under a rear side of the display to support the display;
   a conductive bracket spaced apart from the conductive plate, the conductive bracket comprising a surface facing a rear side of the conductive plate, wherein the conductive bracket defines a cavity portion disposed below the display and the conductive plate; and
   a connecting member electrically connecting the conductive plate and the conductive bracket, the connecting member comprising:
      a first conductive portion overlapping the cavity portion of the conductive bracket and, contacted with the rear side of the conductive plate, and
      a second conductive portion spaced apart from the conductive plate, the second conductive portion comprising:
         a first section disposed across over the cavity portion of the conductive bracket,
         a second section attached to the surface of the conductive bracket, and
         a third section attached to the surface of the conductive bracket, wherein the first section extends from the second section of the second conductive portion to the third section of the second conductive portion,
      wherein the first conductive portion of the connecting member is disposed on the first section of the second conductive portion of the connecting member.

2. The electronic device of claim 1, wherein at least a portion of a side surface of the first conductive portion faces an inner surface of the cavity portion.

3. The electronic device of claim 2, wherein the side surface of the first conductive portion is spaced apart from the inner surface of the cavity portion.

4. The electronic device of claim 1, wherein a distance between the conductive plate and the conductive bracket is smaller than a distance between a surface of the first conductive portion contacted with the rear side of the conductive plate and another surface of the first conductive portion opposite to the surface of the first conductive portion.

5. The electronic device of claim 1, wherein a portion of the first section of the second conductive portion contacted with the first conductive portion is disposed inside the cavity portion.

6. The electronic device of claim 1, further comprising a supporter between the conductive plate and the conductive bracket,
   wherein the supporter is configured to provide a gap between the conductive plate and the conductive bracket.

7. The electronic device of claim 1, wherein the first conductive portion comprises a core providing a shape of the first conductive portion and conductive fibers surrounding at least a portion of the core.

8. The electronic device of claim 7, wherein the core comprises a metal material supporting the conductive plate.

9. The electronic device of claim 7, wherein the core comprises a deformable elastic material.

10. The electronic device of claim 1, wherein the second conductive portion comprises conductive fibers configured to electrically connect to the conductive bracket.

11. The electronic device of claim 1, wherein the connecting member further comprises a third conductive portion crossing a region of the cavity portion that overlaps with the second conductive portion when viewing the display from a first direction toward the display, and a conductive tape attaching both ends of the third conductive portion to the surface of the conductive bracket.

12. The electronic device of claim 1, wherein the first conductive portion is disposed between the conductive plate and the second conductive portion.

13. The electronic device of claim 1, wherein the cavity portion comprises a groove recessed from the surface of the conductive bracket, and
   wherein a portion of the first conductive portion and the second conductive portion is disposed within the groove and is spaced apart from an inner surface of the groove.

14. The electronic device of claim 1, wherein the cavity portion comprises a through hole extending from the surface of the conductive bracket to another surface of the conductive bracket opposite to the surface of the conductive bracket.

15. The electronic device of claim 14, further comprising a printed circuit board disposed at an end of the through hole formed on the other surface,
  wherein a portion of the first conductive portion and the second conductive portion is disposed within the through hole and is spaced apart from the printed circuit board.

16. The electronic device of claim 1, further comprising a conductive tape between the first conductive portion and the conductive plate.

17. The electronic device of claim 1, wherein, when the display is depressed in a direction of the rear side of the display, the first conductive portion is configured to be moved into the cavity portion based on deformation of the display caused by an external force applied to the display.

18. An electronic device comprising:
  a display;
  a conductive plate disposed under a rear side of the display to support the display;
  a conductive bracket spaced apart from the conductive plate, the conductive bracket comprising a surface facing the conductive plate and the display, wherein the conductive bracket defines a cavity portion disposed below the conductive plate and the display;
  a supporter between the display and the conductive bracket to form a gap between the display and the conductive bracket;
  a connecting member electrically connecting the conductive plate and the conductive bracket, the connecting member comprising:
    a first conductive portion overlapping the cavity portion of the conductive bracket and contacted with the conductive plate, and
    a second conductive portion spaced apart from the conductive plate, the second conductive portion comprising:
      a first section disposed over the cavity portion of the conductive bracket,
      a second section attached to the surface of the conductive bracket, and
      a third section attached to the surface of the conductive bracket, wherein the first section extends from the second section of the second conductive portion to the third section of the second conductive portion;
  a first conductive tape between the connecting member and the conductive bracket; and
  a second conductive tape between the connecting member and the conductive plate.

19. The electronic device of claim 18, wherein a height of the supporter is smaller than a distance from a surface of the first conductive portion contacted with the conductive plate to a surface of the first conductive portion opposite to the surface of the first conductive portion connected with the conductive plate.

20. The electronic device of claim 18, wherein at least portion of a side surface of the first conductive portion is spaced apart from an inner surface of the cavity portion and faces the inner surface of the cavity portion.

* * * * *